United States Patent Office 3,517,065
Patented June 23, 1970

3,517,065
PREPARATION OF KETENES
Harold Crosbie Fielding, Northwich, England, assignor to Imperial Chemical Industries Limited, London, England, a corporation of Great Britain
No Drawing. Filed Feb. 19, 1968, Ser. No. 706,676
Claims priority, application Great Britain, Mar. 9, 1967, 11,084/67
Int. Cl. C07c 49/22; C08f 15/18
U.S. Cl. 260—585.5                     1 Claim

ABSTRACT OF THE DISCLOSURE

The novel highly fluorinated ketene $(C_2F_5)_2(CF_3)C.CHCO$ described as (perfluoro-1-methyl-1-ethyl-propyl) ketene, is made by removing the elements of water from the perfluoroalkyl-substituted acetic acid $(C_2F_5)_2(CF_3)C.CH_2COOH$ (derived from tetrafluoroethylene pentamer) or the elements of hydrogen chloride from its acid chloride. The preferred method is to heat the acid with phosphorus pentoxide at 100°–200° C. The ketene is a liquid B.P. 107°–108° C. and is a useful intermediate for the preparation of surfactants and compounds possessing useful oil- and water-repelling properties suitable for application to textiles and leather. For example it reacts with methoxypolyethylene glycols to give non-ionic surfactants: with polyvinyl alcohol or hydroxyalkyl acrylates to give monomers that polymerise to give compounds possessing these useful properties; and with polyethylene imine in situ on textiles.

BACKGROUND OF THE INVENTION (a) *Field.*—Aliphatic fluorine chemistry based on derivatives of tetrafluoroethylene oligomers.

(b) *Prior art.*—Bis(perfluoroalkyl) ketenes are known.

SUMMARY OF THE INVENTION

Preparation of the novel ketene $(C_2F_5)_2(CF_3)C.CHCO$ from the perfluoroalkyl-substituted acetic acid $(C_2F_5)_2(CF_3)C.CH_2COOH$ by heating it with phosphorus pentoxide at 100°–200° C.

This invention relates to a novel highly fluorinated ketene and to its preparation from a perfluoroalkyl-substituted acetic acid.

In U.K. application No. 3361/67 corresponding to U.S. application S.N. 699,049 filed Jan. 19, 1968, we have described reactions between oligomers of tetrafluoroethylene and aqueous solutions of sodium or potassium hydroxides, among which is that between the pentamer $(C_2F_4)_5$ and 30–60% by weight solutions of the hydroxides which yields the perfluoroalkylacetic acid acid $(C_2F_5)_2(CF_3)C.CH_2COOH$ which may be described as (perfluoro-1-methyl-1-ethyl-propyl) acetic acid.

We have now found that this acid and its acid chloride readily lose water and hydrogen chloride respectively to give a novel ketene having the formula $(C_2F_5)_2(CF_3)C.CH.CO$ which may be described as (perfluoro-1-methyl-1-ethyl-propyl) ketene.

The invention thus in one form provides the ketene described as (perfluoro-1-methyl-1-ethyl-propyl) ketene and having the formula $(C_2F_5)_2(CF_3)C.CH.CO$.

The invention in another form provides a process for making (perfluoro-1-methyl-1-ethyl-propyl) ketene, $(C_2F_5)_2(CF_3)C.CH.CO$ comprising removing the elements of water from (perfluoro-1-methyl-1-ethyl-propyl) acetic acid $(C_2F_5)_2(CF_3)C.CH_2.COOH$ The invention in yet another form provides a process for making (perfluoro-1-methyl-1-ethyl-propyl) ketone. $(C_2F_5)_2(CF_3)C.CH.CO$ comprising removing the elements of hydrogen chloride from the acid chloride of (perfluoro-1-methyl-1-ethyl-propyl) acetic acid $(C_2F_5)_2(CF_3)C.CH_2COCl$ Removal of the elements of water from (perfluoro-1-methyl-1-ethyl-propyl) acetic acid is conveniently accomplished by heating it with a dehydrating agent, for example phosphorus pentoxide, oleum, or by heating it alone. The preferred method is to heat it with phosphorus pentoxide at 100° C.–200° C.

Removal of the elements of hydrogen chloride from the acid chloride can conveniently be brought about by heating it under reflux.

The ketene of the invention is a useful intermediate. For example it reacts with dry polyvinyl alcohol, as illustrated in Example 3, to give a polymer soluble in various halogenated hydrocarbons. The solutions so obtained can be applied to textiles, leather and paper in order to impart oil- and water-repelling properties thereto. The ketene itself when applied to cellulosic surfaces, for example paper, confers oil- and water-resisting properties thereon.

The ketene reacts with hydroxyethyl methacrylate and related acrylic esters to give a monomer as illustrated in Example 4. This monomer polymerises to a polymer having oil- and water-repelling properties, for example cotton fabrics treated with a solution of the polymer and then dried possess good resistance to soiling by mineral oils and to wetting by aqueous liquids.

The ketene reacts with methoxypolyethylene glycols to give non-ionic surface-active agents as illustrated in Example 5; and it reacts with amines, for example dimethylaminopropane diamine, to give a cationic surface-active agent.

The ketene can also be applied to textiles pre-treated with, for example polyethylene imine, to give a durable finish thereon having oil- and water-repelling properties as illustrated in Example 6.

The invention is illustrated by Examples 1 and 2.

Example 1

(Perfluoro-1-methyl-1-ethyl-propyl) acetic acid $(C_2F_5)_2(CF_3)CCH_2COOH$ (60 g.) and phosphorus pentoxide (45 g.) were heated together in a dry flask at 150° C. A volatile liquid was formed and allowed to distil out of the flask into a dry receiver protected from atmospheric moisture by a guard-tube containing silica gel. The liquid product (52 g.) was redistilled (B.P. 107–108° C.) to give the ketene (50 g.). This showed an intense infra-red absorption band at 4.6μ, attributable to the —C=C=O group. $F^{19}$ nuclear magnetic resonance measurements showed two equivalent perfluoroethyl groups and a single perfluoromethyl group, and proton nuclear magnetic resonance measurements showed a single proton. Mass-spectrographic analysis showed a parent ion for $C_8F_{13}HO$, and micro-analysis data corresponded to the empirical formula $C_8F_{13}HO$. This combination of evidence supports the structural formula $(C_2F_5)_2(CF_3)CCH=C=O$ for the product.

Example 2

The sodium salt $(C_2F_5)_2(CF_3)CCH_2COONa$ (30 g.) of (perfluoro-1-methyl-1-ethyl-propyl) acetic acid was heated with phthaloyl chloride (30 g.) at 150° C. A volatile liquid was distilled out of the reaction system and shown by gas liquid chromatography to be a mixture of two components. Fractionation of the liquid gave a main fraction (B.P. 107–108° C.) identical with the ketone prepared in the experiment described in Example 1. A higher boiling fraction (79–81° C. at 120 mm. Hg) was shown by elemental analysis (Cl, 9.2% by weight; $C_8F_{13}H_2OCl$ requires Cl to be 9.0%), infra-red absorption spectra, mass spectra and nuclear magnetic resonance measurements to consist of the acid chloride $(C_2F_5)_2(CF_3)CCH_2COCl$. On refluxing this acid chloride for two hours hydrogen chloride was evolved and the remainder on examination by gas-liquid chromatography showed a peak of the same retention time as the ketene $(C_2F_5)_2(CF_3)CCH=C=O$.

Example 3

The ketene $(C_2F_5)_2(CF_3)CCH=C=O$ (10 g.) and dry polyvinyl alcohol (2 g.) were heated together under reflux for 12 hours, ingress of moisture being prevented by a guard-tube containing silica gel. The polyvinyl alcohol slowly dissolved to form a viscous amber-coloured melt of a polymeric compound. The latter was soluble in 1,1,2-trifluoro-1,2,2-trichloroethane and the solution imparted good oil- and water-repelling properties to cotton and wool, leather and paper.

Example 4

To a stirred solution of stabilized hydroxyethyl methacrylate (3.9 g.) in dry 1,1,2-trichloro - 1,2,2 - trifluoroethane (60 mls.) was added dropwise a solution of the ketone $(C_2F_5)_2(CF_3)CCHCO$ (10.0 g.), in the same solvent (20 mls.). An exothermic reaction occurred during the mixing. Stirring was continued until the temperature of the mixture fell to that of the room whereupon the solution was washed with water and dilute aqueous sodium hydroxide solution, dried over an hydrous magnesium sulphate and distilled under reduced pressure from copper. A fraction boiling at 82° C./2–4 mm. Hg was identified spectroscopically as the desired methacrylate $(C_2F_5)_2(CF_3)CCH_2COOCH_2CH_2OOCC(CH_3)CH_2$ Similar reactions occur between the ketene and 2-hydroxypropylacrylate and -methacrylate.

Example 5

The ketene $(C_2F_5)_2(CF_3)CCHCO$ (3.5 g.) was added dropwise and with stirring to a dried methoxypolyethylene glycol of molecular weight 750 (7.5 g.) at 35–40° C. An exothermic reaction occurred, after which the mixture was allowed to cool. Infra-red spectroscopy showed none of the starting materials to be present but instead a new compound with strong absorption at 5.7μ.

A 0.1% by weight aqueous solution of this material had a surface tension of 25 dynes/cm. at 20° C.

Similar reactions were carried out and similar results obtained with methoxypolyethylene glycols of other molecular weights for example a 0.1% by weight aqueous solution of the product from one of molecular weight 350 had a surface tension of 22 dynes/cm. at 20° C.

Example 6

Pieces of cotton gaberdine (7" x 7") were treated with a 2% aqueous solution of polyethylene imine and then dried in an air oven at 80° C. The dry cloth was then padded in a 2% by weight solution of the ketene in $CF_2Cl \cdot CFCl_2$. The cloth was air-dried ad cured at 100° C. for 5 minutes, after which it showed good resistance to mineral oil and to water.

What we claim is:
1. The ketone having the formula

$$(C_2F_5)_2(CF_3)C \cdot CHCO$$

and described as (perfluoro-1-methyl - 1 - ethyl - propyl) ketene.

References Cited

FOREIGN PATENTS 1,008,919   5/1963   Great Britain.

OTHER REFERENCES

Adams, "Org. Reactions," vol. 3, pp. 122, 4 and 5 (1946).

BERNARD HELFIN, Primary Examiner

N. P. MORGENSTERN, Assistant Examiner

U.S. Cl. X.R.

106—2; 252—356; 260—487, 544